July 11, 1933.    A. T. C. HALE ET AL    1,917,645

BACK SIGHT FOR SMALL ARMS

Filed Sept. 8, 1932

Alfred Thomas Corbyn Hale
Elijah Keeling
INVENTORS

Patented July 11, 1933

1,917,645

UNITED STATES PATENT OFFICE

ALFRED THOMAS CORBYN HALE AND ELIJAH KEELING, OF BIRMINGHAM, ENGLAND, ASSIGNORS OF ONE-THIRD TO A. G. PARKER & COMPANY, LIMITED, OF BIRMINGHAM, ENGLAND

BACK SIGHT FOR SMALL ARMS

Application filed September 8, 1932, Serial No. 632,100, and in Great Britain April 19, 1932.

This invention concerns improvements in back sights for small arms, and relates more particularly to that kind of back sight which comprises an attachment plate to which is pivoted a sight post carrying the sight carrier, screw and nut means being provided for adjusting the elevation of the sight, and screw means also being provided for adjusting the sight post laterally for windage purposes.

The object of this invention is to provide a back sight of the kind specified of generally improved form, and in which the possibility of unintentional movements of the sight taking place is reduced to a minimum.

Referring to the drawing:—

Figure 1:
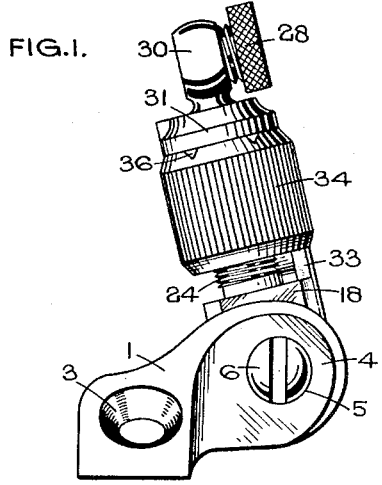
Figure 1 is a side elevation of a back sight for small arms constructed in accordance with this invention.

In the embodiment of this invention illustrated in the drawing, 1 is an attachment plate having a concave under surface 2 to enable it to be placed on the top of the barrel action or stock of a rifle, and countersunk holes 3 for the passage of securing screws. The attachment plate is provided with a pair of parallel spaced ears 4 at its rear end, each having an axial hole 5, and these holes are in alignment with one another.

A pivot pin provided with a head 6 and a shank in two diameters 7 and 8 oppositely screw threaded has its head 6 located in one of the holes 5 in one of the ears 4, and has its reduced shank part 8 extending into the hole 5 of the other ear 4. On the reduced shank part 8 is screwed a cylindrical nut 9 rotatably mounted in the hole 5 in that ear into which projects the shank part 8 of the pivot pin, and this nut is retained in its ear 4 by means of a grub screw 10 engaging a circumferential groove 11 in the nut. The nut is provided with a cross cut 12 by which it may be rotated, or may have a milled or knurled head. Also the nut is provided with a circumferential flange 13 provided on its underside with a series of spaced annularly arranged radial depressions 14, and a ball 15 is adapted to engage successively with each of these depressions 14 as the nut 9 is rotated. The ball 15 is pressed outwardly by means of a helical spring 16 housed in a recess 17 in that ear 4 in which the nut is revolvable. By this means the said pivot pin can be bodily moved axially.

A sight post 18 is screwed at its lower end on to the shank part 7 of the said pivot pin, and the latter passes through the sight post at right angles to the axis thereof. It will be seen therefore that adjusting the pivot pin bodily axially adjusts the sight post laterally for windage purposes.

Figure 2:
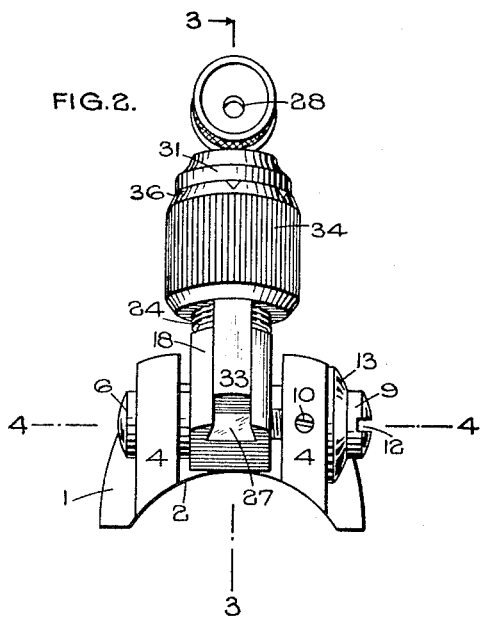
Figure 2 is a front elevation of the same.
Figure 3:
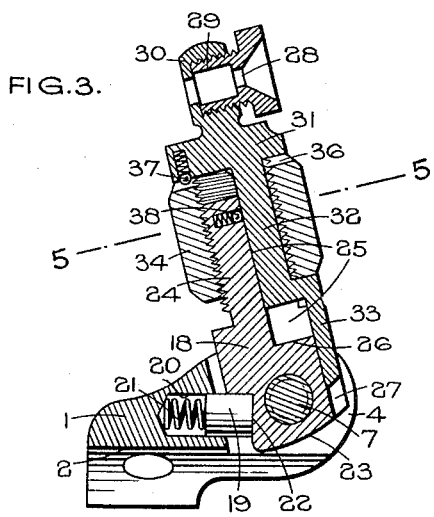
Figure 3 is a vertical sectional elevation on the line 3—3 of Figure 2.

The sight post can be moved into either of two positions, one in which it lies more or less parallel to the under surface of the attachment plate 1, and the other in which it extends upwardly and slightly forwardly from the attachment plate. The sight post is retained releasably in either of these positions by means of a spring pressed plunger 19 slidable in a cylindrical recess 20 in the attachment plate 1 and actuated by a spring 21 disposed in this recess, and the outer end of the plunger 19 is adapted to engage, when the sight post 18 is in the position shown in Figures 1 to 3, with a flat 22 formed at the lower end of the sight post, but when the sight post is in the more or less horizontal position, the plunger 19 engages the lower surface 23 of the sight post.

Figure 4:
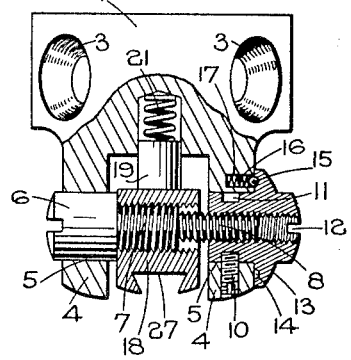
Figure 4 is a part sectional plan on the line 4—4 of Figure 2.
Figure 5:
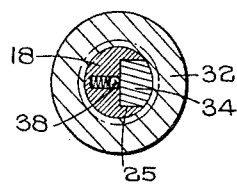
Figure 5 is a section on the line 5—5 of Figure 3.

The upper part 24 of the sight post is cylindrical and is provided with a fine left hand screw thread. The upper part of the sight post is also provided with a deep longitudinal groove 25 of rectangular cross section which is closed at its lower end at 26 but open at its upper end, and extends right to the upper extremity of the sight post 18. The lower part of the sight post 18 also is provided with a longitudinal groove 27 which is shallower than the groove, but is in alignment with the latter and virtually forms an extension thereof, and this latter groove 27 is dovetailed as is clearly shown in Figure 4.

On the screw threaded portion 24 of the sight post 18 is mounted a cylindrical nut which is suitably milled on its external surface and is adapted to traverse the screw threaded part of the sight post when it is rotated.

A sight 28 is provided and has a tubular shank 29 which screws into the upper end of a sight collar 30, and this sight collar is provided with a circular flange 31 and with a non-circular part 32 extending parallel to the axis of the threaded portion of the sight post, and adapted to be a close sliding fit in the groove 25 in the latter with which it corresponds in cross section. The part 32 of the sight carrier is provided with a parallel extension or finger 33 offset therefrom, and this part 33 is dovetailed to correspond with, and slide in, the said groove 27 in the lower part of the sight post. This finger may be provided with an index mark which may co-operate with a scale provided on the sight post so as to indicate the positions of the sight carrier relative to the sight post.

A cylindrical adjusting nut 34 is mounted on the screw threaded portion 24 of the sight post so as to embrace the latter and the part 32 of the sight carrier 30, and opposite ends of the nut 34 abut the circular flange 31 and a shoulder 35 of the sight carrier so that as the nut 34 is rotated on the sight post, and therefore moves axially thereon, the sight carrier is correspondingly moved in an endwise direction to vary the elevation of the sight 28.

In order to prevent unintentional movement of the nut 34, the upper end of the latter is provided with a series of spaced radial grooves or recesses 36 which are adapted to be engaged successively by a spring pressed ball 37 carried by the flange 31 of the sight carrier 30.

In order that slackness or backlash between the sight carrier and the sight post may be reduced to a minimum, the sight post is provided with a spring pressed ball 38 adapted to bear on the back or base of the part 32 of the sight carrier 30.

It will be seen that the spring pressed ball 38 tends to push the part 32 of the sight carrier 30 out of the groove 25 in the sight post and to draw the internal threads of the nut 34 closely on to the external threads of the screw threaded portion 24 of the sight post 18 so that backlash of the nut is reduced to a minimum.

What we claim then is:—

1. A back sight for small arms, comprising an attachment plate, a sight post on said plate, said post being exteriorly screw threaded, a sight carrier carried by said sight post, an adjusting nut associated with said sight carrier and engaging the screw thread on said sight post for adjusting the said carrier with respect to the said post, and means for preventing relative rotation between said carrier and said post, said means comprising a slide on said sight carrier slidably engaging a groove in said sight post, said slide extending parallel to the longitudinal axis of said screw and nut means.

2. A back sight for small arms, comprising an attachment plate, a sight post on said plate, said post being exteriorly screw threaded, a sight carrier carried by said sight post, an adjusting nut embracing said sight carrier and said sight post and engaging the screw thread on the latter, spaced abutments on said sight carrier, said adjusting nut being disposed between said abutments so that the sight carrier is constrained to move with the nut, and means for preventing relative rotation between said carrier and said post, said means comprising a slide on said sight carrier slidably engaging a groove in said sight post, said slide extending parallel to the longitudinal axis of said screw and nut means.

3. A back sight for small arms, comprising an attachment plate, a sight post on said plate, a sight carrier carried by said sight post, screw and nut means for adjusting said sight carrier relative to said sight post to vary the elevation of the sight, means for preventing relative rotation between said carrier and said post, said means comprising a slide on said sight carrier slidably engaging a groove in said sight post, said groove being stepped along its length, and a finger provided on the sight carrier, said finger being slidable in the shallower part of said groove.

4. A back sight for small arms, comprising an attachment plate, a sight post on said plate, a sight carrier carried by said sight post, screw and nut means for adjusting said sight carrier relative to said sight post to vary the elevation of the sight, means for preventing relative rotation between said carrier and said post, said means comprising a slide on said sight carrier slidably engaging a groove in said sight post, said slide extending parallel to the longitudinal axis of said screw and nut means, a spring pressed ball located in a recess in said sight post and a spring in said recess, said ball acting between said sight post and said sight carrier to take up slackness therebetween.

5. A back sight for small arms, comprising an attachment plate, a sight post on said plate, a pivot pin connecting said post at its lower end to said plate, said pivot pin having a screw threaded portion, an adjusting nut engaging said screw threaded portion and revolvably, but not axially movably mounted in the attachment plate, for moving the sight post axially with said pivot pin and with respect to the attachment plate to allow for windage, a spring pressed ball between said adjusting nut and the attachment plate, said post being exteriorly screw threaded, a sight carrier carried by said sight post, an adjusting nut associated with said sight carrier and engaging the screw thread on said sight post for adjusting the said carrier with respect to the said post, a spring pressed ball between said sight post and said sight carrier, and means for preventing relative rotation between said carrier and said post, said means comprising a slide on said sight carrier slidably engaging a groove in said sight post, said slide extending parallel to the longitudinal axis of said screw and nut means.

6. A back sight for small arms, comprising an attachment plate, a sight post on said plate, a pivot pin connecting said post at its lower end to said plate, said pivot pin having a screw threaded portion, an adjusting nut engaging said screw threaded portion and revolvably, but not axially movably, mounted in the attachment plate, for moving the sight post axially with said pivot pin and with respect to the attachment plate to allow for windage, said post being exteriorly screw threaded, a sight carrier carried by said sight post, an adjusting nut embracng said sight carrier and said sight post and engaging the screw thread on the latter, spaced abutments on said sight carrier, said adjusting nut being disposed between said abutments so that the sight carrier is constrained to move with the nut, and means for preventing relative rotation between said carrier and said post, said means comprising a slide on said sight carrier slidably engaging a groove in said sight post, said slide extending parallel to the longitudinal axis of said screw and nut means.

In witness whereof we affix our signatures.
ALFRED THOMAS CORBYN HALE.
ELIJAH KEELING.